United States Patent [19]
Jeunehomme et al.

[11] 3,851,176
[45] Nov. 26, 1974

[54] PLURAL GAS NON-DISPERSIVE INFRARED ANALYZER

[75] Inventors: Michel L. Jeunehomme, Novi; Malcolm C. Johnson, Orchard Lake, both of Mich.

[73] Assignee: The Bendix Corporation, Southfield, Mich.

[22] Filed: Nov. 5, 1973

[21] Appl. No.: 412,994

[52] U.S. Cl. .............................. 250/343, 250/345
[51] Int. Cl. ......................................... G01m 21/26
[58] Field of Search ............ 250/343, 344, 345, 346; 356/88, 93

[56] References Cited
UNITED STATES PATENTS
3,569,696   3/1971   Karlson .............................. 250/344

Primary Examiner—James W. Lawrence
Assistant Examiner—C. E. Church
Attorney, Agent, or Firm—Bruce L. Lamb; W. G. Christoforo

[57] ABSTRACT

A non-dispersive infra-red gas analyzer capable of measuring concentrations of more than one component of a sample gas mixture. Beam chopper means synchronously diverts IR along separate paths each of which terminates in the same sample gas cell. A filter cell capable of absorbing all IR in the absorption band of one component but transmitting IR absorbable by other components is placed in each separate path. Beams in the separate paths alternately act as reference and sample beams. The output from detectors sensible to IR absorbable by each component is synchronously demodulated to give separate indications of the concentrations of the components.

13 Claims, 6 Drawing Figures

PLURAL GAS NON-DISPERSIVE INFRARED ANALYZER

The present invention relates to infrared gas analyzers of the non-dispersive absorption type.

Gases may be analyzed as to composition and concentration by determining the absorption of particular wavelengths infrared radiation of known intensity. Alternatively, they may be analyzed by comparing the absorption of infrared radiation, the intensity and wavelength of which is not necessarily known, by a sample gas with a standard gas. Conventionally, apparatus for practicing the first mentioned method includes a source of wide band radiation and dispersion means such as a prism or grating for separating the radiation into a plurality of lines. Thereafter a monochromator selects a particular line for use in measurement. Instruments of this kind are commonly known as dispersion types and although they are considerably more complex than the non-dispersive types of interest herein, they are capable of analyzing a wide variety of substances, even when the constituents thereof are unknown.

In a non-dispersive type analyzer, radiation, usually wide band, is passed alternately through a reference gas cell and a sample gas cell. The radiation absorbed in each cell is detected by temperature or pressure sensitive means and compared. The difference between absorptions is assumed to indicate the concentration of a specific component of the sample gas. Errors may arise, however, if another component is present in the sample gas which is also absorptive of the applied radiation. Such confusion may be eliminated by using only a narrow band of radiation centered on the absorption band of the gas component of interest or by using a detector which is responsive only to radiation within the absorption band of the analyte. When so constructed, the conventional non-dispersive IR analyzer is restricted to the measurement of the concentration of a single component gas in a sample gas mixture.

Recently with the promulgation of regulations defining permissible levels of noxious gases in automobile exhaust gases, need has arisen for a simple reliable instrument capable of measuring the concentration of several component gases in the gas mixture constituting automobile exhaust.

It is an object of the present invention to provide an analyzer of the non-dispersive IR type capable of measuring simultaneously the concentrations of more than one gas in a sample mixture.

It is a further object to provide a non-dispersive IR analyzer capable of measuring concentrations of more than one gas in a sample mixture without confusion in the results of such measurements.

A more specific object of the invention is to provide an analyzer of the nondispersive IR type capable of measuring simultaneously the concentrations of carbon monoxide and hydrocarbons in automobile exhaust gas or any other pair of IR absorptive gases which may be present therein.

The attainment of these and other objects of the invention will become evident as an understanding thereof is gained through study of the following description and accompanying drawings.

Briefly, the invention employs an IR source producing a spectrum of radiation which includes wavelengths within an absorption band for each of the analyte gases. An optical system including a rotating mirror synchronously diverts a beam from the IR source into two separate paths. A filter cell is positioned in each of the paths, each cell being charged with a different one of the analyte gases to absorb substantially all of the radiation at the wavelengths at which the analyte gas contained by that cell absorbs and to transmit radiation having wavelengths within the absorption band of the analyte gas contained by the other cell. There are thus provided two synchronously alternating beams which mutually constitute reference and analyzing beams for both of the analyte gases. The beams are then recombined by the optical system to pass along a single path through a sample cell containing the mixture of gases in which the analyte concentrations is to be determined. A pair of thermopile detectors, each preceded by an optical band-pass filter centered on the absorption band of the analyte which it is to indicate, is positioned at the far end of the sample cell. Thus, during one half cycle of beam alternation, the beam will enter the sample cell with radiation absorbable by one of the analytes in the sample, but not by the other. During this period the detector associated with the absorbing analyte produces an output dependent on the amount of absorption while the other detector produces a reference output corresponding to complete absorption of the other analyte. During the next half cycle of beam alternation, the roles of the detectors are reversed so that the detector producing a reference output in the preceding half cycle now produces an output dependent upon the concentration in the sample of the analyte with which that detector is associated while the other detector is now in the reference phase. By synchronously demodulating both detector outputs separate signals are obtained indicating the concentration of each of the analytes in the sample.

Figure 1:
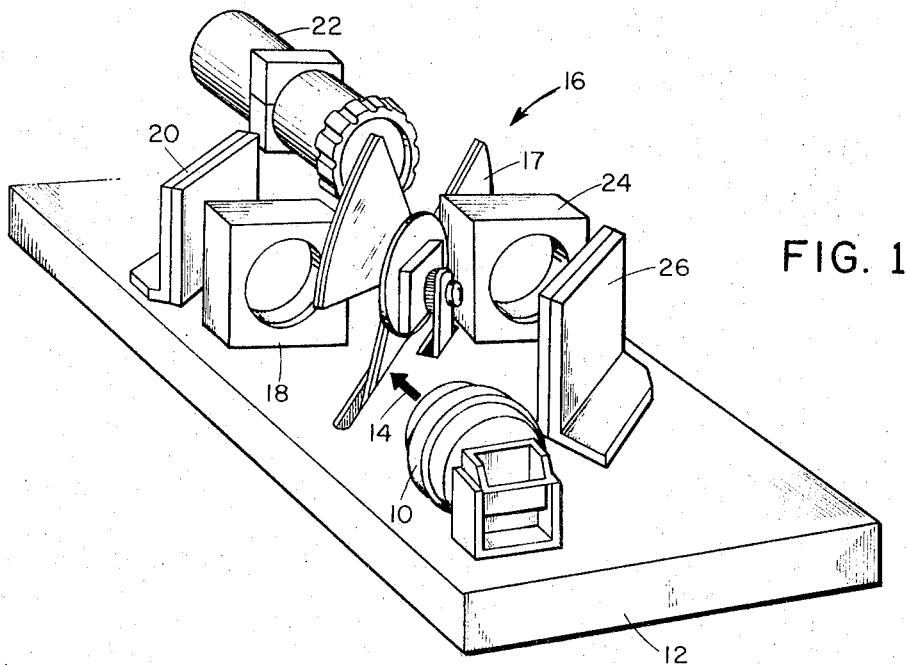
FIG. 1 is a perspective view of the invention.

Referring to FIG. 1, the source 10 of IR radiation, which preferably includes a suitable collimating mirror (not shown), is secured to a bench 12 so as to project a beam of radiation as indicated by arrow 14. A motor driven rotating mirror 16 intersects the path of beam 14 at 45° thereto. Mirror 16 comprises spaced sectorial sections both front and back surfaces of which are reflective. Three reflective sectors are employed in this embodiment, but more or less than that number may be used. A filter cell 18 is positioned along beam 14 to receive radiation when mirror 16 is not in a position to divert the beam. Cell 18 is provided with end windows which are transparent to IR radiation and is charged with a known concentration of a first analyte gas. A plane mirror 20 is positioned beyond filter cell 18 at 45° to the center line passing through source 10 and cell 18 so as to deflect beam 14 perpendicularly from its original line of travel and against the back surface of a sector of mirror 16. Positioned along an axis parallel to the center line of source 10, cell 18 and mirror 20 are a sample cell 22, a second filter cell 24 and a second plane mirror 26. The axis of the sample cell 22, filter cell 24 and mirror 26 is spaced from the center of rotation of mirror 16 a distance equal to the spacing therefrom of the center line of source 10, cell 18 and mirror 20. Cell 24 is similar to cell 18 except for being charged with a known concentration of a different analyte gas. The end of sample call 22 facing mirror 16 is transparent to IR radiation. A pair of thermopile IR detectors 27, 28 (FIG. 2 or FIG. 3) are mounted in the opposite end of cell 22. Each of the detectors is preceded by an optical bandpass filter 30, 32, one of which passes the band of IR radiation corresponding to the absorption band of the analyte gas contained by cell 18 and the other of which passes a band of IR radiation corresponding to the absorption band of the analyte gas contained by cell 24. Gas inlet and outlets in cell 22 provide a flow therethrough of the mixture to be analyzed.

Figure 2:
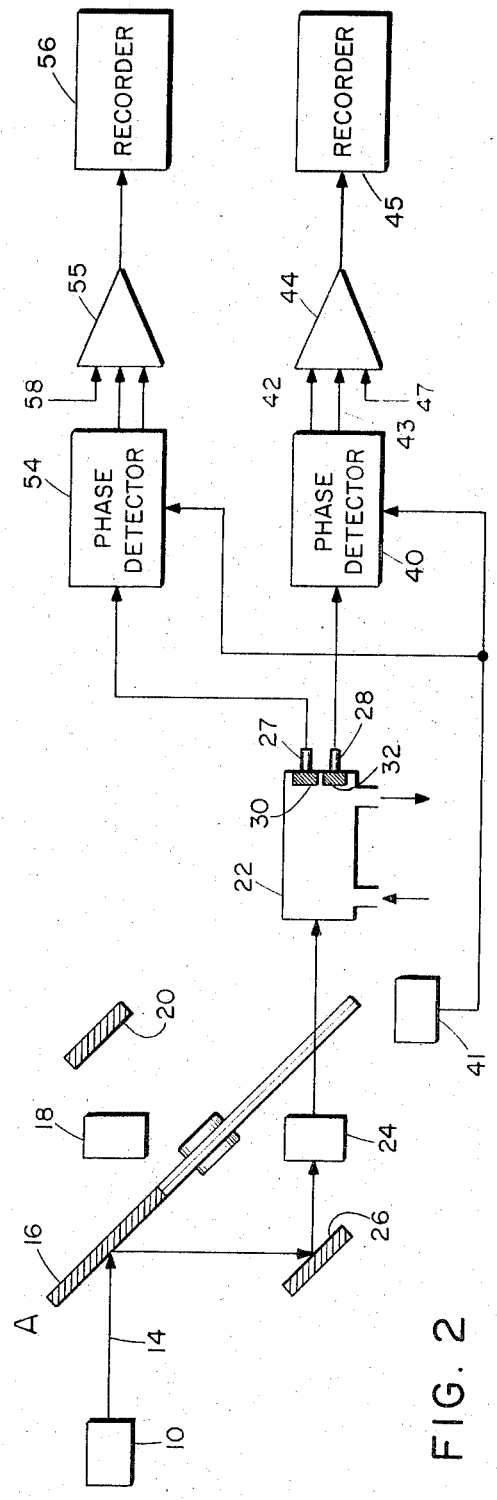
FIGS. 2 and 3 are plan views of the invention, generally schematic, useful in understanding its operation.

Referring to FIG. 2, it will be seen that the optical arrangement is such that when a sector of mirror 16 intercepts beam 14, the beam is reflected against mirror 26 and thence through filter cell 24 into sample cell 22. In the next half cycle of mirror rotation (FIG. 3) beam 14 passes through filter cell 18 to mirror 20 where it is reflected against the black reflective surface of mirror 16, thence into sample cell 22.

If the analyzer is intended to measure concentrations of carbon monoxide and hydrocarbons in automobile exhaust, filter cell 24 is filled with a mixture of hydrocarbon gases and filter cell 18 is filled with carbon monoxide. The concentration of gases used in cells 18 and 24 is greater than the expected concentration of those gases in the sample mixture to be analyzed. Consequently, in mirror position A of FIG. 2 the beam entering sample cell 22 does not contain any radiation absorbable by hydrocarbons in the sample. However the beam does then include radiation absorbable by carbon monoxide in the sample. Filters 30 and 32 may suitably be centered on 3.2 um and 4.7 um, respectively, so that detector 27 is indicative of hydrocarbon content of the sample and detector 28 is indicative of the carbon monoxide content thereof. In FIG. 2, therefore, detector 27 is in the reference phase and detector 28 is in the analyzing phase.

Figure 3:
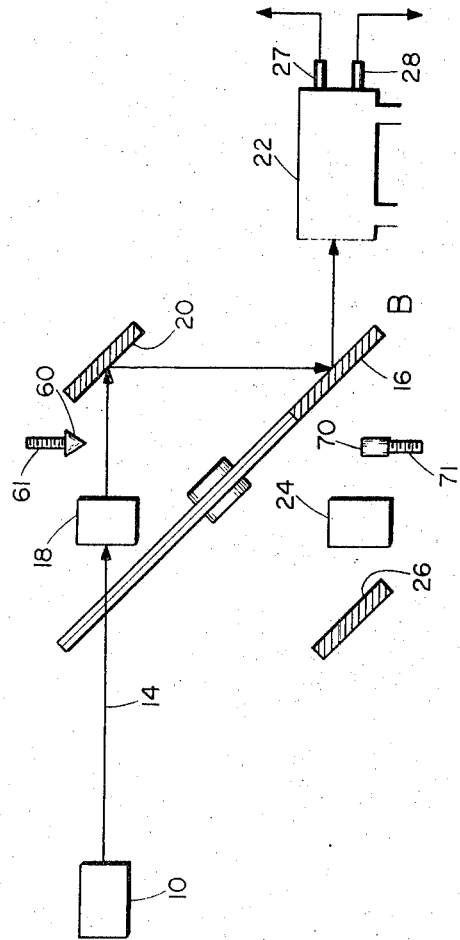

In mirror position B of FIG. 3, none of the radiation entering sample cell 22 is absorbable by carbon monoxide therein because all of the absorbable radiation has been removed from the beam by filter cell 18. The beam then includes radiation absorbable by hydrocarbons contained in the sample. At this time detector 27 is in the analyzing phase and detector 28 is in the reference phase.

Figure 4:
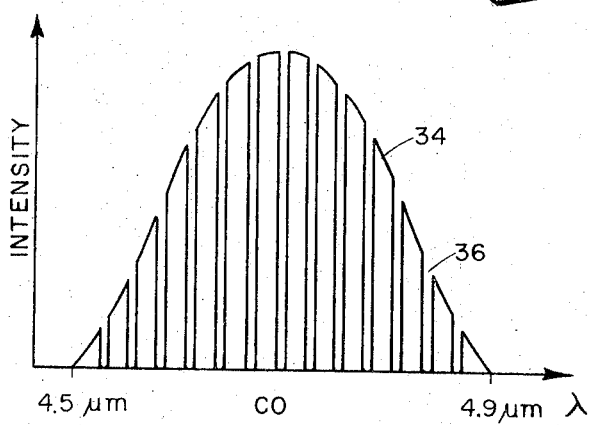
FIG. 4 is a chart showing the spectral response of a radiation detector used in the invention and absorption of certain wavelengths of radiation by carbon monoxide.

FIG. 4 illustrates schematically the spectrum observed by detector 28 during reference phase B. The outline 34 of the curve is typical of the bandpass characteristic of filter 32. The valleys or discontinuities 36 in detector result from absorption of particular wavelengths of radiation at a particular concentration of CO in filter cell 18. If the concentration of CO in the filter cell is increased the absorption lines 36 are broadened resulting in less total energy under curve 34 and since the amplitude of the output of detector 28 is dependent upon the total energy under the curve rather than the peak intensity of any particular wavelength thereunder, detector output is reduced. Concentrations of CO in the sample lower than that of filter cell 18 show absorption lines which are narrower than those of FIG. 5 and since these fall within the valleys 36, the presence of the lower concentration of CO in the sample cannot change the output of detector 28 during reference phase B.

Figure 5:
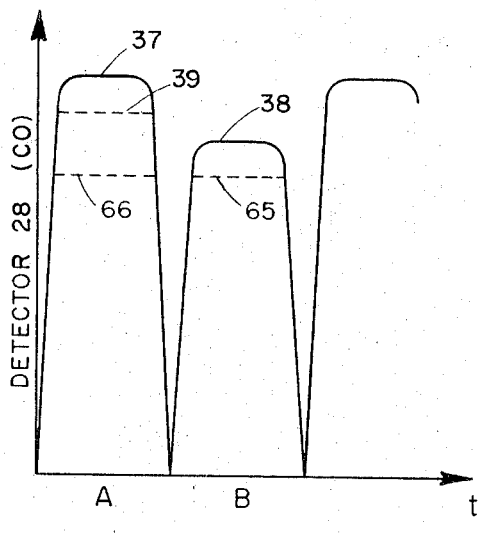
FIGS. 5 and 6 are waveform diagrams showing response of radiation detectors during reference and analyzing phases.

FIG. 5 illustrates the waveform of detector 28 during operation. Assuming no CO to be present in the sample during analyzing phase A, detector 28 will produce maximum output 37 corresponding to the total energy under curve 34 when the latter is not broken by absorption lines 36. Filter cell 24 has no effect on the output of detector 28 since its absorption band is located in a different part of the spectrum. During reference phase B the output of detector 28 falls to level 38 corresponding to the total energy under curve 34 broken by the absorption bands 36. If CO is present in the sample in some concentration less than that of filter cell 18, the output level of detector 28 will decrease in analyzing phase A to a level 39 intermediate between levels 37 and 38. The concentration of analyte in the sample is revealed by comparing the level of detector output obtained during the analyzing phase with that obtained during the reference phase. These outputs are separated for detector 28 by a phase detector 40 (FIG. 2) which receives as inputs signal from detector 28 and a synchronizing signal from a transducer 41. Transducer 41 may suitably be a photoelectric device, a synchro or other known device which produces a switching signal synchronized with the position of mirror 16. Phase detector 40 is a conventional circuit which produces signals on lines 42 and 43, respectively, proportional to the output of detector 28 during analyzing phase A and reference phase B. These outputs are compared in amplifying circuit 44. Its output may be indicated by a meter or displayed on a recorder 45.

It will be appreciated from reference to FIG. 5 that amplifier 44 does not simply add the outputs on lines 42 and 43 to yield a signal proportional to analyte concentration nor does it simply take the difference between these inputs. An elementary implementation of the function of amplifier 44 can be accomplished by causing phase detector 40 to produce one of the outputs on lines 42 or 43 with inverted polarity. Summing the outputs on lines 42 and 43 then produces a signal proportional to the difference between levels 37 and 38 at zero percentage concentration. An unconventional presentation of data then results in that zero concentration causes maximum deflection of the recorder and increasing concentrations provide proportionally less deflection. Data can be presented in conventional form, however by introducing a constant offset voltage on line 47 to amplifier 44 adjusted to balance out the maximum difference occurring between signals on lines 42 and 43 at zero concentration. Alternatively, as will be explained hereinafter, similar balancing can be accomplished optically.

Figure 6:
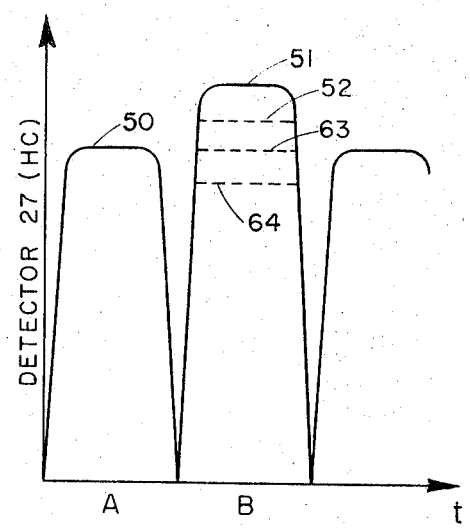

Analysis for the second analyte (hydrocarbons) is accomplished in the same manner as that described for the first analyte (CO) except that mirror position A then becomes the reference phase for hydrocarbons while mirror position B becomes the analyzing phase. Referring to FIG. 6, the output of detector 27 is at a minimum level 50 during reference phase A since radiation which is absorbable by the hydrocarbons in cell 22 has been absorbed by the hydrocarbons contained in filter cell 24. In analyzing phase B, output of detector 27 rises to level 51 for zero percent concentration of hydrocarbons in the sample. Filter cell 18 has no effect on this output since the wavelengths absorbed by that cell are within the band 4.5 – 4.9 um, whereas hydrocarbons absorb within the band 2.9 – 3.5 um. The presence of hydrocarbons in the sample reduces the output of detector 27 in the analyzing phase B from level 51 to level 52, which output level approaches level 50 as the concentrations of hydrocarbons in the sample approach the concentration of hydrocarbons in filter cell 24. Processing of signal from detector 27 is similar to that performed on signal from detector 28 and includes a phase detector 54 (FIG. 2), comparator 55 and recorder 56. An offset voltage may be provided on line 58 to serve the same purpose as that on line 47.

In many cases improved signal-to-noise ratio may be obtained by replacing one or both of the offset voltages on lines 47 and 58 with optical balancing means. As shown schematically in FIG. 3 these means, for the hydrocarbon channel, comprise an opaque conical body 60 mounted on an adjusting screw 61 for precise advancement into the beam passing through cell 18. By advancing cone 60 into the beam the level of output from detector 27 may be reduced from 51 to level 63 (FIG. 6) for zero concentration of hydrocarbons in the sample. Thereafter, the presence of hydrocarbons in the sample will cause further reduction in the output of detector 27, when in analyzing phase B, to level 64. The difference then between detector level 50 in reference phase A and detector level 64 during analyzing phase B is proportional to concentration of hydrocarbons in the sample and the need for offset voltage on line 58 is eliminated. The carbon monoxide channel is not unaffected by the use of balancing cone 60 because the latter is opaque to all radiation and consequently reduces the output of detector 28 during reference phase B from level 38 to level 65 (FIG. 5). Offset voltage on line 47 must then be increased to compensate for this decrease in detector level output during reference phase B or the output of detector 28 can be reduced from level 37 when no CO is present in the sample to level 66, likewise with no CO in the sample by means of a quartz plate 70 mounted on an adjusting screw 71 for precise advancement into the beam passing through filter cell 24. Since quartz is opaque to radiation within the band at 4.5 – 4.9 um but transparent to radiation within the band 2.9 – 3.5 um, balancing the carbon monoxide channel in this manner does not affect the previously optically balanced hydrocarbon channel. Because of possible non-linearity of output in the CO channel better results may be obtained when measuring lower ranges of CO concentration by using a fixed offset voltage on line 47 than by attenuating the analyzing signal with plate 70.

Although the invention has been specifically disclosed in a preferred embodiment providing optical means for directing the radiation beam along two separate paths into the sample cell other optical arrangements are possible in which the beam is directed along more than two separate paths into the sample cell. For example, a symmetrical cruciform disposition of the elements shown in FIG. 1 would provide four separate beam paths into the sample cell in which case a sample gas mixture could be analyzed for concentrations of four component gases.

The invention claimed is:

1. A non-dispersive infrared analyzer for indicating individual concentrations of plural component gases in a sample gas mixture, comprising
    means providing a beam of infrared radiation;
    means for directing said beam sequentially along separate paths, said paths being equal in number to the number of component gases to be analyzed in said sample gas mixture;
    a plurality of filter cells, each of which is filled with a known concentration of one of said component gases, one of said filter cells being positioned in each of said separate beam paths so as to be illuminated by radiation from said source and each to absorb therefrom radiation at wavelengths dependent upon the composition of gas in said illuminated cell and to transmit radiation at other wavelengths;
    a sample cell filled with the gas mixture to be analyzed;
    means for directing into said sample cell radiation transmitted by said filter cells in said separate paths;
    a plurality of radiation detectors positioned to detect radiation transmitted by said sample cell, said detectors being equal in number to the number of said separate paths;
    a plurality of optical filters, one each preceding one each of said detectors, said filters each transmitting different bands of wavelengths of radiation, each said band corresponding to the wavelengths absorbable by the gas in each of said filter cells, said filters each rejecting substantially all radiation having wavelengths outside the transmission band associated with each said filter; and
    demodulating means for each of said radiation detectors, each said demodulating means operating synchronously with said beam directing means and providing signals for comparing detector output when said beam passes through the one of said filter cells containing gas absorptive of the wavelengths transmitted by said optical filter associated with said detector with output of said detector when said beam passes through a different one of said filter cells.

2. An analyzer as claimed in claim 1 with additionally,
    means in one of said separate beam paths for attenuating the radiation contained in said beam.

3. An analyzer as claimed in claim 1 wherein said beam directing means comprises a rotating mirror.

4. A non-dispersive infrared analyzer for measuring the concentration of two different analyte gases in a sample mixture of gases comprising
    means providing a beam of infrared radiation;
    means for directing said beam alternately along two separate paths;
    a first filter cell containing a first analyte gas in known concentration positioned in one of said separate beam paths to absorb radiation from said beam in a spectrum characteristic of said first analyte gas;
    a second filter cell containing a second analyte gas in known concentration positioned in the other of said separate beam paths to absorb radiation from said beam in a spectrum characteristic of said second analyte gas;
    a sample cell filled with gas to be analyzed;

means directing both said beams passing through said first and second filter cells in said sample cell;

first and second radiation detectors positioned to detect radiation transmitted through said sample cell from said beams directed therein;

first and second optical filters preceding said first and second detectors, said first optical filter transmitting only radiation within a band of wavelengths of radiation absorbable by said first analyte gas and rejecting substantially all radiation of other wavelengths, said second optical filter transmitting only radiation within a band of wavelengths of radiation absorbable by said second analyte gas and rejecting substantially all radiation of other wavelengths; and first and second demodulating means respectively receiving the outputs of said first and second detectors, said demodulating means being synchronized with said beam directing means to provide for each of said detectors signals for comparing the absorption of radiation by analyte gas contained by said sample cell with the absorption of radiation by that analyte gas contained in one of said filter cells.

5. An analyzer as claimed in claim 4 wherein said beam directing means comprises a rotating mirror.

6. An analyzer as claimed in claim 4, with additionally,
means in at least one of said separate beam paths for adjustably attenuating the radiation contained in the beam following said one path.

7. A non-dispersive infrared analyzer for measuring the concentration of two different analyte gases in a sample mixture of gases, comprising:
means producing a beam of infrared radiation;
a rotating mirror, said mirror being located with respect to said beam so that in one position of mirror rotation said beam is directed along a first path and in another position of mirror rotation said beam is directed along a second path;
a first filter cell positioned in said first path, said first filter cell being filled with a known concentration of a first analyte gas and absorbing radiation in a spectrum characteristic of said first analyte gas while transmitting other radiation;
a second filter cell positioned in said second path, said second filter cell being filled with a known concentration of a second analyte gas and absorbing radiation in a spectrum characteristic of said second analyte gas while transmitting other radiation;
a sample gas cell filled with gas to be analyzed;
a first fixed mirror positioned in said first path for directing radiation transmitted by said first filter cell into said sample cell;
a second fixed mirror positioned in said second path for directing radiation transmitted by said second filter cell into said sample cell;

first and second radiation detectors positioned to detect radiation transmitted by said sample cell;

first and second optical filters preceding said first and second radiation detectors, said first optical filter transmitting a band of radiation within the spectrum of radiation absorbable by said first analyte gas and rejecting other radiation, said second optical filter transmitting a band of radiation within the spectrum of radiation absorbable by said second analyte gas and rejecting other radiation; and first and second demodulating means, said first demodulating means receiving the output of said first radiation detector and providing signals for comparing said first detector output occurring when said beam is directed along said first path with said first detector output occurring when said beam is directed along said second path, said second demodulating means receiving the output of said second radiation detector and providing signals for comparing said second detector output occurring when said beam is directed along said second path with said second detector output occurring when said beam is directed along said first path.

8. An analyzer as claimed in claim 7, with additionally,
means positioned along said first path for attenuating an adjustable amount of radiation in the beam following said first path.

9. An analyzer as claimed in claim 8, with additionally,
means positioned along said second path for attenuating by an adjustable amount a limited band of radiation in the beam following said second path.

10. An analyzer as claimed in claim 7 wherein said rotating mirror comprises a circular sector of reflecting material, the axis of rotation of said mirror intersecting said first path at an acute angle, the rotation of said mirror periodically interrupting said first path to reflect said beam of radiation along said second path.

11. An analyzer as claimed in claim 10 wherein said means producing said beam, said first filter cell and said first fixed mirror are positioned along a first axis, and said sample cell, said second filter cell and said second fixed mirror are positioned along a second axis, said first and second axes being parallel and equally spaced from the center of rotation of said rotating mirror.

12. An analyzer as claimed in claim 11 wherein said first and second mirrors are plane mirrors respectively positioned at 45° to said first and second axes, and the axis of rotation of said rotating mirror intersects said first and second axes at 45°.

13. An analyzer as claimed in claim 12 wherein said sector of said rotating mirror is a plane mirror both surfaces of which are reflective.

* * * * *